US006643642B1

(12) United States Patent
Habegger

(10) Patent No.: US 6,643,642 B1
(45) Date of Patent: Nov. 4, 2003

(54) HIERARCHICAL MAPPED DATABASE SYSTEM FOR IDENTIFYING SEARCHABLE TERMS ASSOCIATED WITH DATA NODES

(75) Inventor: Millard J. Habegger, Scituate, MA (US)

(73) Assignee: Bitpipe Communication, Inc., Boston, MA (US)

( * ) Notice: Subject to any disclaimer, the term of this patent is extended or adjusted under 35 U.S.C. 154(b) by 0 days.

(21) Appl. No.: 09/457,096

(22) Filed: Dec. 7, 1999

(51) Int. Cl.$^{7}$ .............................................. G06F 17/30
(52) U.S. Cl. .............................................. 707/5; 707/3
(58) Field of Search ......................... 707/3, 5, 6, 104.1, 707/1, 2, 4; 345/700, 764, 853

(56) References Cited

U.S. PATENT DOCUMENTS

| | | | | | |
|---|---|---|---|---|---|
| 5,379,420 | A | * | 1/1995 | Ullner | 707/3 |
| 5,418,947 | A | | 5/1995 | Hsu et al. | |
| 5,471,611 | A | | 11/1995 | McGregor | |
| 5,488,717 | A | | 1/1996 | Gibson et al. | |
| 5,519,858 | A | | 5/1996 | Walton et al. | |
| 5,812,134 | A | * | 9/1998 | Pooser et al. | 345/356 |
| 5,991,756 | A | * | 11/1999 | Wu | 707/3 |
| 5,999,927 | A | * | 12/1999 | Tukey et al. | 707/5 |
| 6,037,935 | A | * | 3/2000 | Bates et al. | 345/335 |
| 6,321,224 | B1 | * | 11/2001 | Beall et al. | 707/5 |
| 6,324,534 | B1 | * | 11/2001 | Neal et al. | 707/3 |
| 6,381,611 | B1 | * | 4/2002 | Roberge et al. | 707/104 |

OTHER PUBLICATIONS

Celentano et al "Knowledge based retrieval of office documents", ACM 1990, pp. 241–253.*

"Guidelines for the Construction, Format, and Management of Monolingual Thesauri" An American National Standard developed by the National Information Standards Organization, Approved Aug. 30, 1993 by the American National Standards Institute, pp. 1–69.

Albert et al. "Diameter of The World Wide Web", *Nature*, vol. 40, Sep. 9, 1999, pp. 130–131.

Wu "Content Based Indexing of Multimedia Databases", *IEEE Transactions on Knowledge and Data Engineering* vol. 6, No. 6, Nov./Dec. 1997, p. 978–989.

Wayner, "Some Assembly Required", *Byte*, vol. 16, No. 6, Jun. 1991, pp. 317.

* cited by examiner

*Primary Examiner*—Uyen Le
(74) *Attorney, Agent, or Firm*—Foley Hoag LLP

(57) ABSTRACT

A system for storing and retrieving records in a database storage unit by employing a hierarchical data map. In one embodiment, a system according to the invention includes a user interface, a search engine, a data storage unit, and a hierarchical data map. In operation, a user enters search terms through the user interface. The user interface couples the search terms to the search engine. The search engine traverses the hierarchical data map to identify data nodes having associated searchable terms that include the user-input search terms. The search engine then captures unique node identifiers for the identified data nodes, and retrieves records in the database storage unit that are encoded with the captured unique node identifiers. Data records are encoded with one or more unique node identifiers, based at least in part on a relationship between the content of the data records and the searchable terms of the data node.

48 Claims, 11 Drawing Sheets

PROVIDE A HIERARCHICAL DATA MAP HAVING A PLURALITY OF HIERARCHIES OF DATA NODES THAT INCLUDE SEARCHABLE TERMS AND UNIQUE NODE IDENTIFIERS — 1002

PROVIDE A DATA STORAGE SYSTEM INCLUDING A PLURALITY OF DATA RECORDS TO WHICH ONE OR MORE UNIQUE NODE IDENTIFIERS ARE ASSIGNED — 1004

PROVIDE A SEARCH ENGINE THAT SEARCHES THE HIERARCHICAL DATA MAP IN RESPONSE TO A USER-INPUT SEARCH TERM AND RETRIEVES DATA RECORDS FROM THE DATA STORAGE SYSTEM ENCODED WITH THE UNIQUE IDENTIFIERS OF DATA NODES THAT INCLUDE THE USER-INPUT SEARCH TERM AND RETRIEVES SEARCHABLE TERMS OF DATA NODES WHOSE UNIQUE IDENTIFIERS ALSO ENCODE THE RETRIEVED DATA RECORDS — 1006

PROVIDE A USER INTERFACE THAT DISPLAYS THE USER-INPUT SEARCH TERM, RETRIEVED DATA RECORDS, AND RETRIEVED SEARCHABLE TERMS OF DATA NODES WHOSE IDENTIFIERS ALSO ENCODE THE RETRIEVED DATA RECORDS — 1008

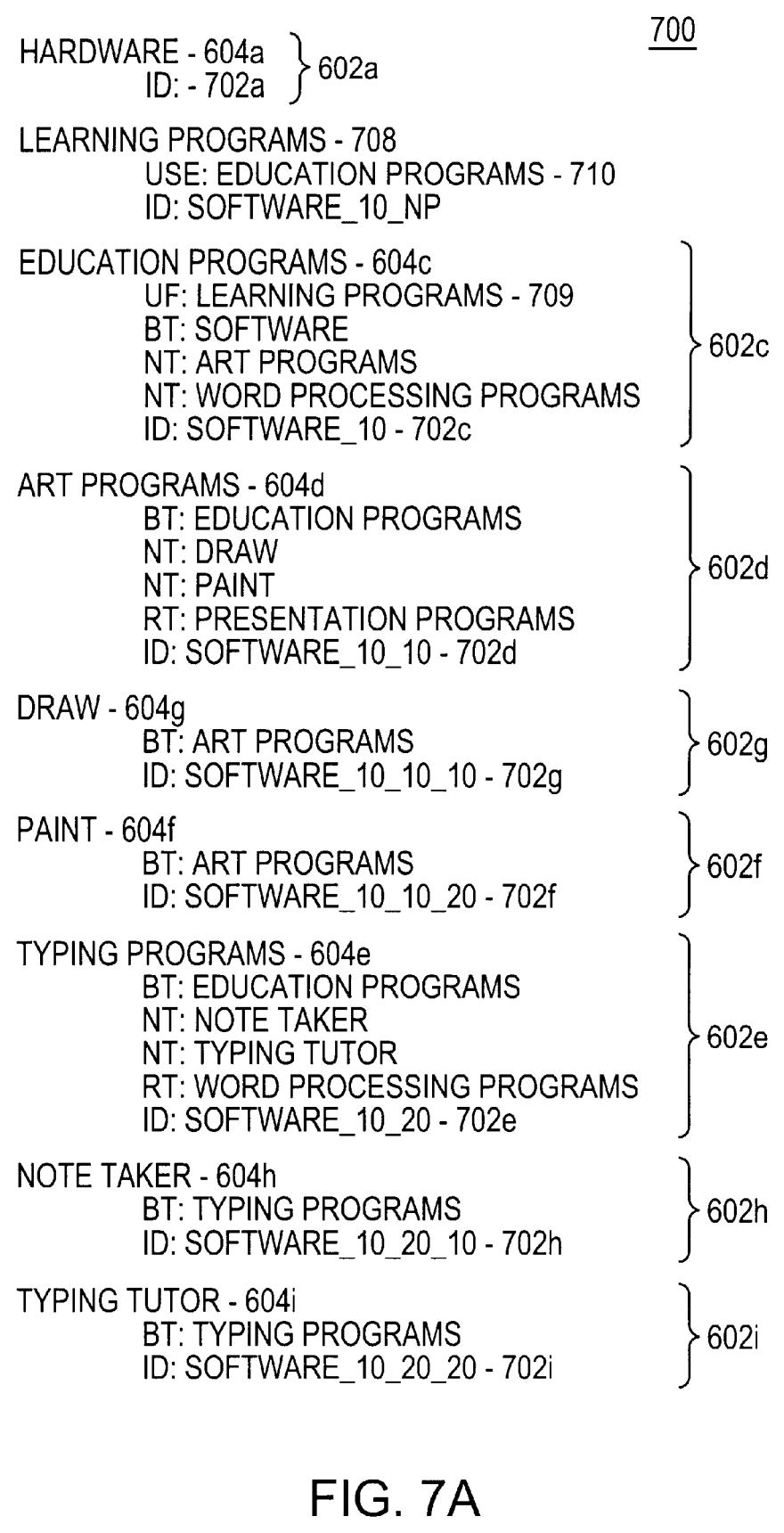

700

HARDWARE - 604a
ID: - 702a
602a

LEARNING PROGRAMS - 708
USE: EDUCATION PROGRAMS - 710
ID: SOFTWARE_10_NP

EDUCATION PROGRAMS - 604c
UF: LEARNING PROGRAMS - 709
BT: SOFTWARE
NT: ART PROGRAMS
NT: WORD PROCESSING PROGRAMS
ID: SOFTWARE_10 - 702c
602c

ART PROGRAMS - 604d
BT: EDUCATION PROGRAMS
NT: DRAW
NT: PAINT
RT: PRESENTATION PROGRAMS
ID: SOFTWARE_10_10 - 702d
602d

DRAW - 604g
BT: ART PROGRAMS
ID: SOFTWARE_10_10_10 - 702g
602g

PAINT - 604f
BT: ART PROGRAMS
ID: SOFTWARE_10_10_20 - 702f
602f

TYPING PROGRAMS - 604e
BT: EDUCATION PROGRAMS
NT: NOTE TAKER
NT: TYPING TUTOR
RT: WORD PROCESSING PROGRAMS
ID: SOFTWARE_10_20 - 702e
602e

NOTE TAKER - 604h
BT: TYPING PROGRAMS
ID: SOFTWARE_10_20_10 - 702h
602h

TYPING TUTOR - 604i
BT: TYPING PROGRAMS
ID: SOFTWARE_10_20_20 - 702i
602i

FIG. 7A

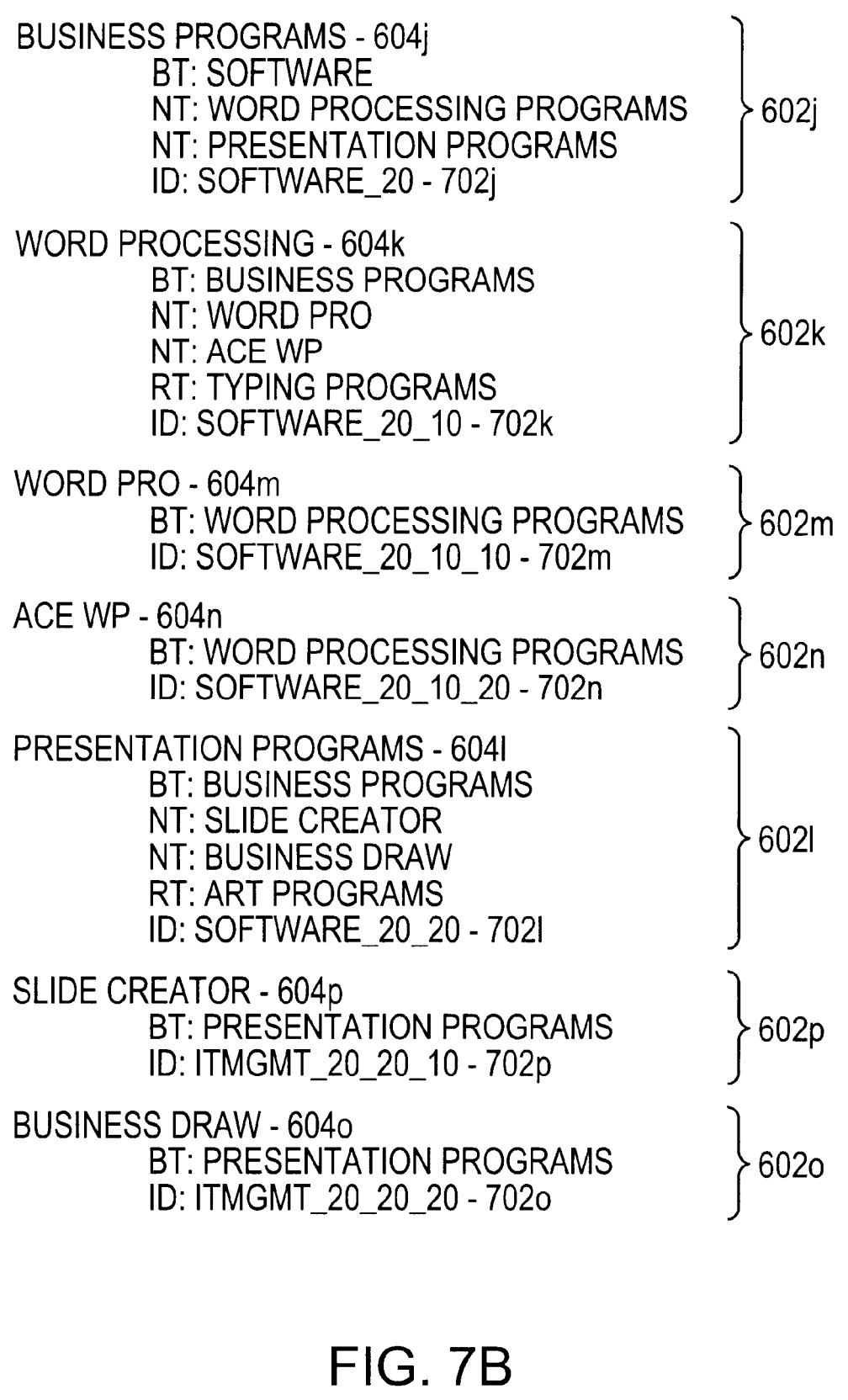

BUSINESS PROGRAMS - 604j
BT: SOFTWARE
NT: WORD PROCESSING PROGRAMS
NT: PRESENTATION PROGRAMS
ID: SOFTWARE_20 - 702j
602j

WORD PROCESSING - 604k
BT: BUSINESS PROGRAMS
NT: WORD PRO
NT: ACE WP
RT: TYPING PROGRAMS
ID: SOFTWARE_20_10 - 702k
602k

WORD PRO - 604m
BT: WORD PROCESSING PROGRAMS
ID: SOFTWARE_20_10_10 - 702m
602m

ACE WP - 604n
BT: WORD PROCESSING PROGRAMS
ID: SOFTWARE_20_10_20 - 702n
602n

PRESENTATION PROGRAMS - 604l
BT: BUSINESS PROGRAMS
NT: SLIDE CREATOR
NT: BUSINESS DRAW
RT: ART PROGRAMS
ID: SOFTWARE_20_20 - 702l
602l

SLIDE CREATOR - 604p
BT: PRESENTATION PROGRAMS
ID: ITMGMT_20_20_10 - 702p
602p

BUSINESS DRAW - 604o
BT: PRESENTATION PROGRAMS
ID: ITMGMT_20_20_20 - 702o
602o

FIG. 7B

SEARCHABLE TERM - 802

HIERARCHICAL MAPPED DATABASE SYSTEM FOR IDENTIFYING SEARCHABLE TERMS ASSOCIATED WITH DATA NODES

FIELD OF THE INVENTION

The invention relates generally to the field of databases and according to one embodiment, a database navigated by a hierarchical data map.

BACKGROUND OF THE INVENTION

A database generally stores data records. Each data record has an associated series of fields that are used to characterize that data record. To search the database for data records that meet particular criteria, the series of characterizing fields for each data record are searched to determine if the database includes any data records meeting the particular criteria. A disadvantage of traditional databases is that even if such a data record exists, it may not be found because the chosen search criteria do not match any of the characterizing fields.

Another approach for indexing information is to code each record in the database with an identifier and maintain a list of valid identifiers in a validation table that is a component of the database. One disadvantage of this method is that the validation tables are usually simple structures, and fail to capture relationships among the items in the validation table. Therefore, a disadvantage of this approach is that a user or application typically must use the exact identifier to retrieve an item in the database, and once retrieved there are no pointers to other information that may also be useful.

Another disadvantage with currently available database systems is that if a record is incorrectly indexed, it may not be found in any non-full text search method. For example, a search of automobiles may not locate a sport utility vehicle if the database characterizes the sport utility vehicle as a truck rather than an automobile.

Accordingly, one object of the invention is to provide a database system having improved flexibility with regard to tolerating inexact search terms.

Another object of the invention is to provide a database system, which exploits relationships among data stored in a database.

A further object of the invention is to provide a database system having improved flexibility with regard to tolerating inexact indexing of records stored in a database.

Other general and specific objects of the invention will in part be obvious and will in part appear hereinafter.

SUMMARY OF THE INVENTION

The invention relates to a database system which, in one embodiment, includes a user interface, a search engine, a data storage system, and a hierarchical data map. The hierarchical data map includes a plurality of hierarchies of data nodes. Each node includes a unique alpha-numeric identifier and a searchable term. Additionally, the nodes are related by both hierarchical and non-hierarchical relationships. For example, in addition to a particular node being related to other nodes that are hierarchically above and below the particular node, the particular node may also be cross-linked to one or more other nodes in branches of different hierarchical trees. According to a further feature, the hierarchical data map forms a thesaurus, substantially as defined by the International Standards Organization (ISO) Standard Z39.19–1993, the contents of which are herein incorporated by reference.

According to a further feature, the data storage system stores records such as documents. Each of the documents is encoded with one or more of the data node unique identifiers. Which identifiers are employed with any particular document is determined by the relationship between the searchable terms of the data nodes and the contents of the document. According to one embodiment, if a document includes a searchable term of a particular node, then that document is encoded with the unique identifier of the particular node. Documents may be encoded with the unique identifiers of more than one data node. According to one embodiment, documents are encoded manually. According to an alternative embodiment, documents are encoded in an automated fashion.

According to one operative embodiment, a user provides search terms to the search engine by way of the user interface. The search engine then attempts to locate the search terms in the hierarchical data map. Once located, the search engine retrieves the unique identifiers of the data nodes having searchable terms including the user-input search term. The search engine then retrieves from the data storage system records encoded with those unique identifiers. According to one embodiment, the unique identifiers are alpha-numeric characters. According to another embodiment, the unique identifiers are the searchable terms.

According to a further feature, before displaying the retrieved data records, the search engine again searches the data map and retrieves a subset of data nodes related to the selected data nodes, such as those data nodes that are hierarchically one step above and/or below the selected data node.

The user interface is adapted for receiving and displaying the retrieved records to the user. According to a further "on-line syndication" feature of the invention, the user interface can be customized to provide a display which emulates the look and feel of an enterprise storing records in the database system of the invention.

In further embodiments, the search engine is adapted for providing the user interface with the searchable terms associated with each of the located data nodes, prior to searching the data storage system. According to another feature, the user interface is further adapted for presenting the user with the searchable terms corresponding to the located data nodes, and for enabling the user to select a first of the presented searchable terms. In response to such a selection, the search engine retrieves records from the data storage system that are encoded with the unique identifier of a first data node associated with the selected searchable term. The user interface then presents the retrieved records to the user.

In an alternative embodiment, prior to providing the retrieved records to the user interface for presentation to a user, the search engine retrieves the unique identifiers from all of the data nodes that are hierarchically below the first data node. The user interface then presents to the user the retrieved records encoded with the unique identifier of the first data node, along with the records encoded with the unique identifiers of the data nodes that are hierarchically below the first data node. Optionally, the user interface also presents the searchable terms associated with those data nodes.

In a further embodiment, the system of the invention provides a browsing feature. According to one embodiment of the browsing feature, rather than entering search terms, the user interfaces with the hierarchical data map to signal the search engine to retrieve documents from the data storage system. By way of example, the user may select a data node via the user interface. In response, the search engine retrieves from the data storage system those records encoded with the unique identifier of the selected data node. The user interface presents the user with the retrieved records, along with a subset of the data nodes that may be, for example, hierarchically above or below the selected data node, or contextually related in some fashion to the selected data node.

In a further feature, in response to the user selecting one of the subset nodes, the search engine retrieves records encoded with the unique identifier of the selected subset node. The user interface then updates the presentation to the user to reflect the newly retrieved records. The user interface also updates the presentation to the user to display a subset of the data nodes that are hierarchically above and/or below the selected subset node.

According to another feature, the system of the invention is adapted to enable a user to employ a combination of search terms and browsing to locate records of interest. By way of example, according to one embodiment, in addition to displaying a retrieved record to the user, the system of the invention also displays all of the unique identifiers with which the record is encoded. In response to the user selecting one of the displayed unique identifiers the system presents all other records encoded with the selected unique identifier. In this way, the system of the invention enables the user to combine the use of search terms and browsing to locate records of interest.

In additional embodiments, the system of the invention is directed to associated methods for searching the data storage system. By way of example, one such embodiment includes the steps of accepting user-input search terms; locating in the hierarchical data map data nodes including searchable terms that match one or more of the user-input search terms; capturing unique identifiers associated with each of the located data nodes; locating records in the data storage system that are encoded with the unique identifiers of the located data nodes; and displaying the search results to the user.

According to further embodiments, the invention is directed to methods of storing data to a database. In one exemplary embodiment of the invention, data records are stored in the data storage system by assigning each data record to a data category and encoding each data record with one or more of the data node unique identifiers. Encoding of a data record is based, at least in part, on the relationship between informational content of the data record and the searchable terms of the data nodes of the hierarchical data map.

As skilled artisans will appreciate, the various features of the invention may be implemented in hardware, software or a combination of the two. Additionally, the system may be operated as a stand-alone mechanism or in co-operation with a communication network such as the Internet or an enterprise's intranet.

BRIEF DESCRIPTION OF THE DRAWINGS

The invention is pointed out with particularity in the appended claims. The above and further advantages of the invention may be better understood by referring to the following description in conjunction with the accompanying drawings, in which:

FIG. 7A is a sample list of exemplary contents of various illustrative data nodes of the hierarchical data map of FIG. 4;

FIG. 7B is a continued sample list of exemplary contents of various illustrative data nodes of the hierarchical data map of FIG. 4;

FIG. 8 is an example of a data node entry template;

DESCRIPTION OF THE ILLUSTRATIVE EMBODIMENT

Figure 1:
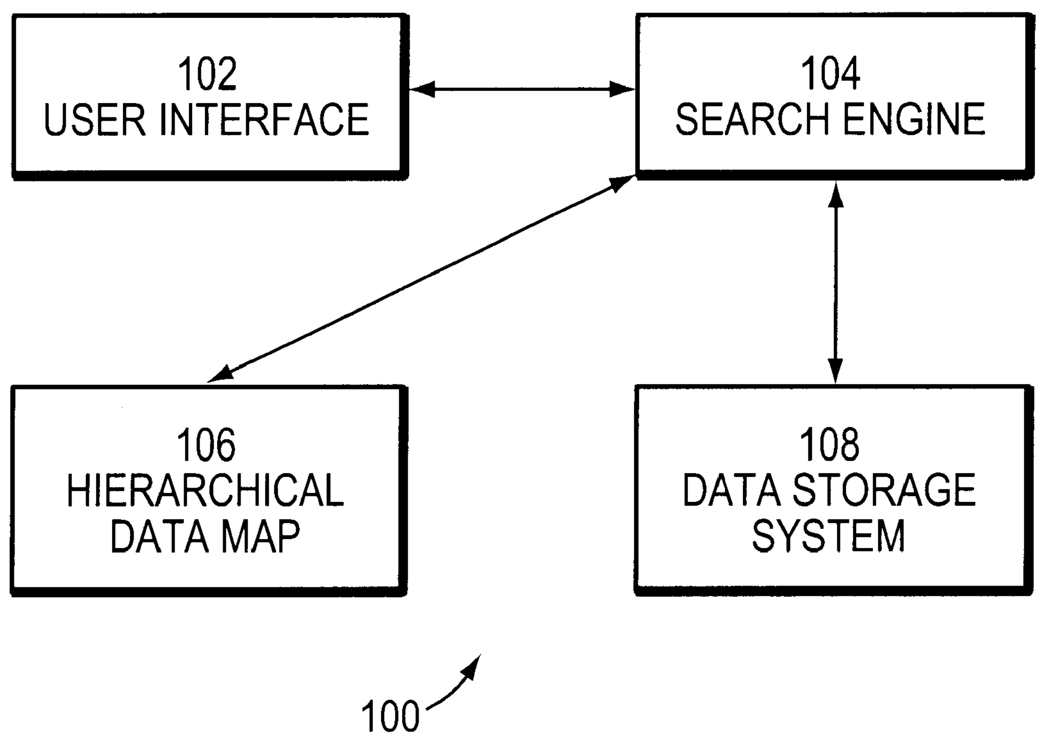
FIG. 1 is a logical block diagram overview of an embodiment of the invention.

FIG. 1 depicts a logical block diagram 100 of an illustrative embodiment of the invention. The diagram 100 includes a user interface 102, a search engine 104, a hierarchical data map 106, and a data storage system 108.

The user interface 102 is a combination of software and hardware mechanisms used to input search terms into the search engine 104, to initiate browsing, and to view search results returned by the search engine 104. The hierarchical data map 106 includes a plurality of hierarchies of data nodes. Each illustrative data node includes a searchable term, a description of the data node's relationships to other data nodes in the plurality of hierarchies, and a unique alpha-numeric node identifier. According to the illustrative embodiment, the hierarchical data map 106 is constructed as a thesaurus, substantially in accord with the International Standards Organization (ISO) Standard Z39.19-1993. The data storage system 108 can include any type of non-volatile storage element, such as magnetic, optical, and electronic storage elements. In the illustrative embodiment, the storage system 108 stores data records. Each data record is assigned one or more alpha-numeric node identifiers, based on a relationship between the informational content of the data record and the searchable terms of one or more data nodes.

According to the illustrative embodiment, the search engine 104 incorporates a commercially available search engine, such as the Ultraseek from Infoseek, Sunnyvale, Calif., the Information Server from Verity, Sunnyvale Calif. or the Dynabase product, from eBusiness Technologies, a division of Inso, Providence, R.I. As described in further detail below, according to one method of operation, the search engine 104 first searches the hierarchical data map 106, and based on the results of that search, retrieves records from the data storage system 108. According to another method of operation, the search engine 104 first searches the data storage system 108 and retrieves records containing a user input search term.

Figure 2:
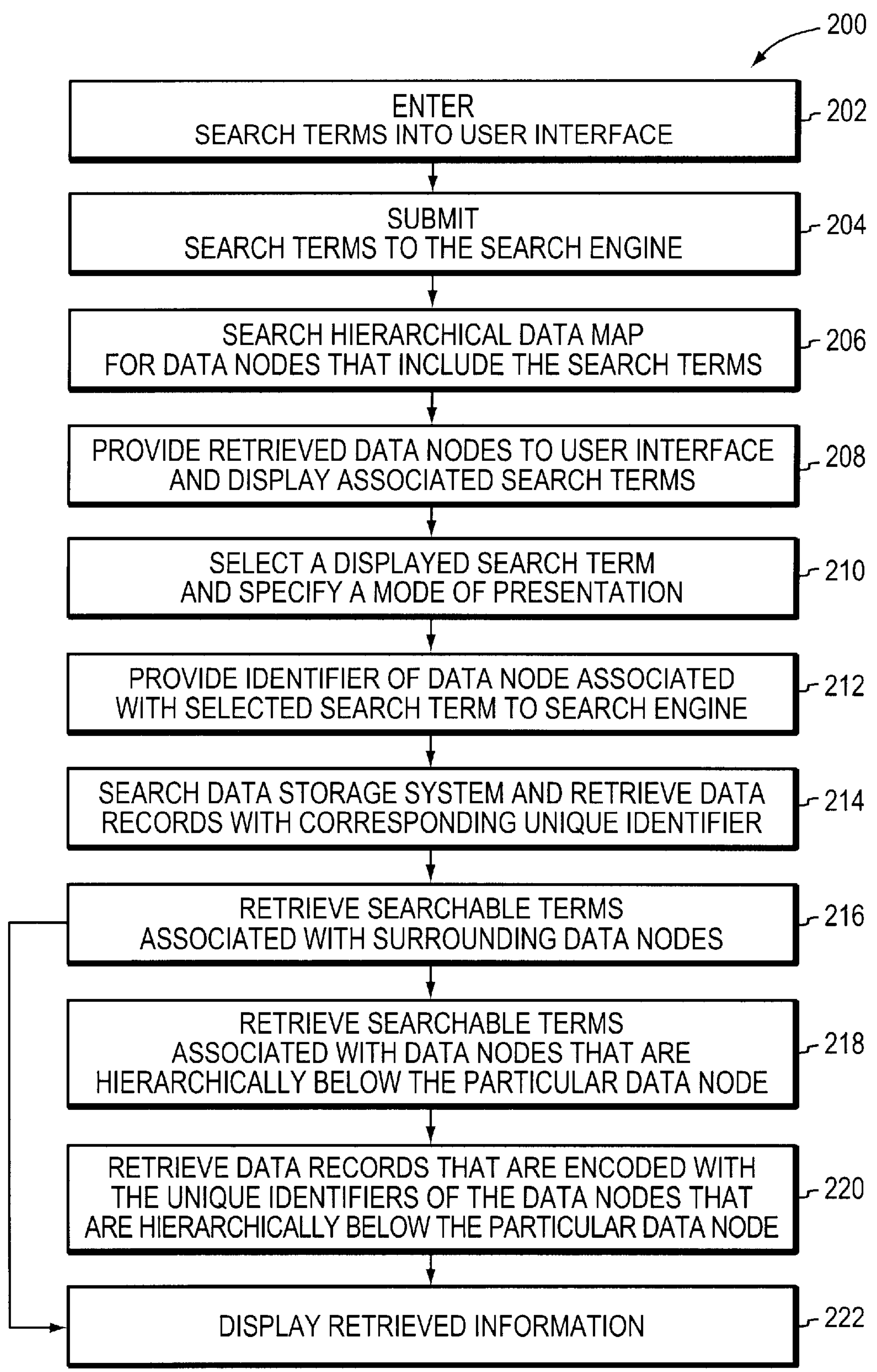
FIG. 2 is a flow chart illustrating a method for searching for a data record, according to one embodiment of the invention.

FIG. 2 provides a flow chart 200 of an illustrative method of the invention. Referring to FIGS. 1 and 2, in one embodiment of the invention, as shown at step 202, a user initiates a search by entering search terms into the user interface 102. As shown at step 204, the user interface 102 then submits the search terms to the search engine 104. In response, and as illustrated in step 206, the search engine 104 searches the hierarchical data map 106 for data nodes including the submitted search terms. The search engine 104 retrieves the data nodes in the hierarchical data map 106 that include the submitted search terms, and as shown in step 208, returns the retrieved data nodes to the user interface 102. The user interface 102 displays to the user the searchable terms of the retrieved data nodes. As indicated in step 210, the user can select one of the displayed terms. As also indicated in step 210, and as discussed in further detail below with respect to steps 216–222, the user can also select a mode of presentation. In response to the user's selection, and as depicted in step 212, the user interface provides the unique identifier of the particular data node associated with the selected term to the search engine 104. As shown in step 214, the search engine 104 then searches the data storage system 108 and retrieves data records that are encoded with the associated unique identifier. In response to the user's mode of presentation selection in step 210, the method 200 either performs step 216 and then proceeds to step 222, or performs steps 216–220 prior to proceeding to step 222. More particularly, in step 216, the search engine 104 searches the hierarchical data map 106 once again, and retrieves the searchable terms associated with data nodes that surround the particular data node. The surrounding data nodes include a subset of the data nodes that are hierarchically above and/or below the particular data node, along with cross-linked data nodes. Cross-links are discussed in more detail with respect to FIG. 6. Illustratively, the subset of data nodes includes the data node that is hierarchically one step above the selected node, the data nodes that are hierarchically one step below the selected data node, and the cross-linked data nodes. As shown in step 222, the search engine 104 presents the searchable terms of the subset of data nodes, along with the retrieved data records to the user interface 102 for display to the user.

As shown in step 218 and 220, according to an alternative user specification in step 210, the search engine 104 retrieves all of the search terms associated with the data nodes hierarchically below the particular data node, and retrieves the data records encoded with the unique identifiers of any of those data nodes. Once again, as shown in step 222, the retrieved information is presented to the user interface 102 for display to the user.

Figure 3:
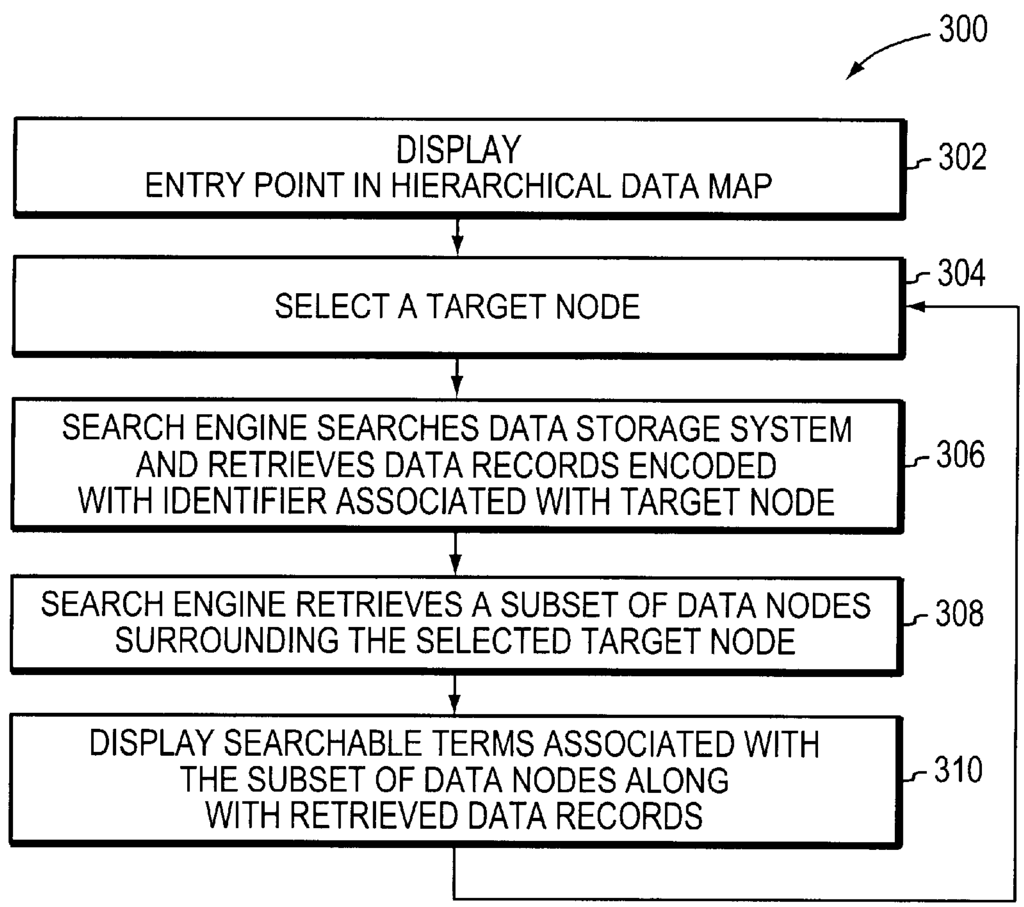
FIG. 3. is a flow chart illustrating a method for browsing a data record, according to one embodiment of the invention.

FIG. 3 is a flow chart 300 depicting an alternative approach for retrieving documents from the data storage system 108. The flow chart 300 illustrates a browsing feature of the invention. Referring to FIGS. 1 and 3, in one embodiment of the invention, as shown in step 302, a user can initiate browsing from any logical point in any hierarchical level of data nodes in the hierarchical data map 106, including the logical top of the heirarchy. As shown in step 304, the user selects a target data node. As shown in step 306, in response to selecting a target data node, the search engine 104 searches for and retrieves any data records encoded with the unique identifier associated with the target data node. As shown in step 308, the search engine 104 then searches the hierarchical data map 106 again and retrieves a subset of the data nodes related to the selected target data node. As described previously, the retrieved subset of data nodes includes, illustratively, the data node that is hierarchically one step above the target data node, the data nodes that are hierarchically one step below the target data node and the cross-linked data nodes. In accord with step 310, the search engine 104 then presents the searchable terms associated with the subset of data nodes, along with the retrieved data records to the user interface 102 for display. As shown at step 304, optionally, a user can select one of the subset of data nodes as a new target data node. In response to such a selection, the illustrative user interface 102 changes the presentation to include documents encoded with the unique identifier of the new target data node. As shown in steps 306 through 310, the user interface 102 also presents the searchable terms of the new subset of data nodes in the hierarchy, from the perspective of the new target data node.

As described below with respect to FIGS. 4 and 5, a user may initiate browsing substantially at any time. For example, a user can perform browsing subsequent to performing term-type searching. Thus, the illustrative system 100 enables a user to combine term-type searching and browsing to efficiently locate records in the data storage system 108.

Figure 4:
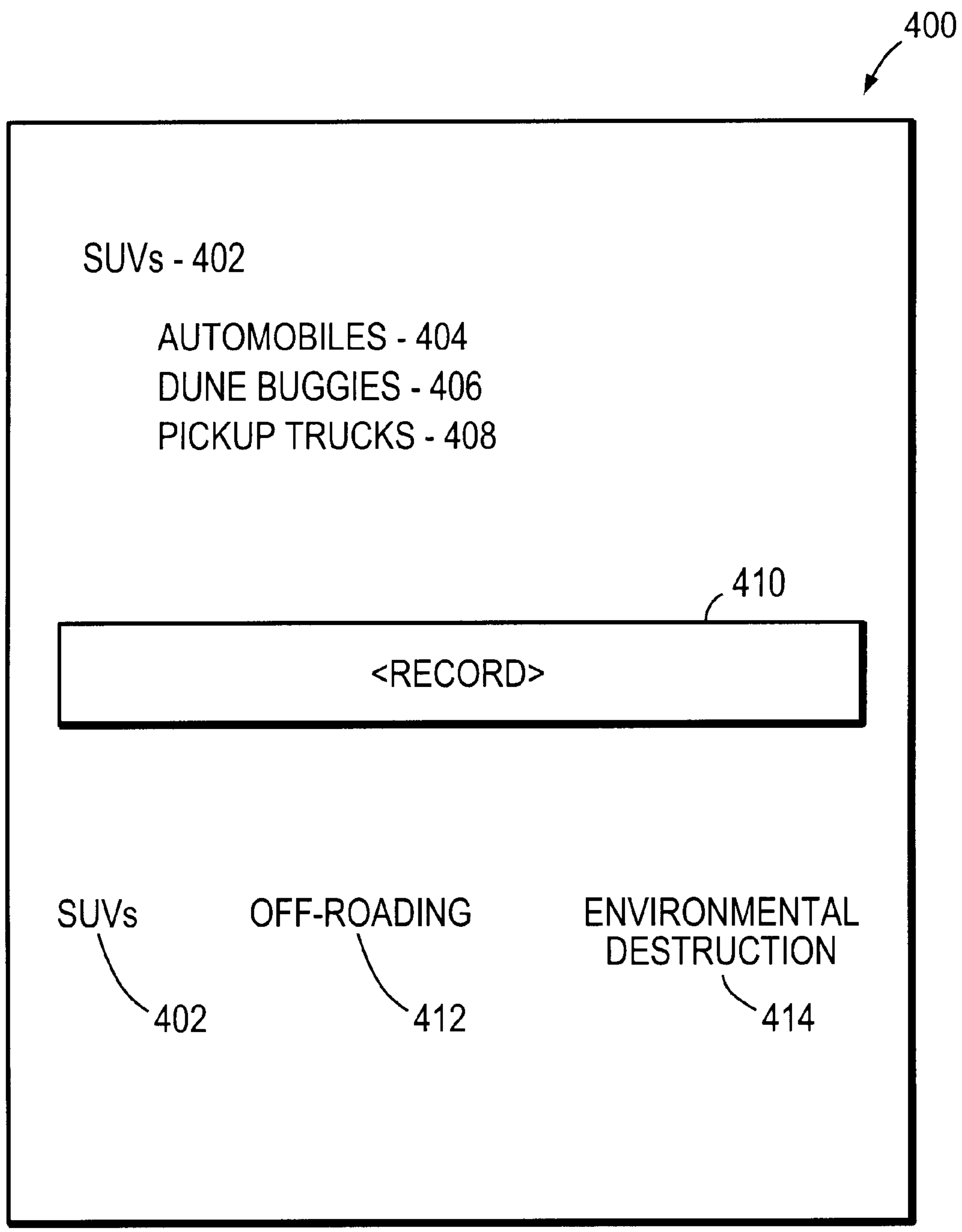
FIG. 4 is a logical representation of an exemplary search results display screen.
Figure 5:
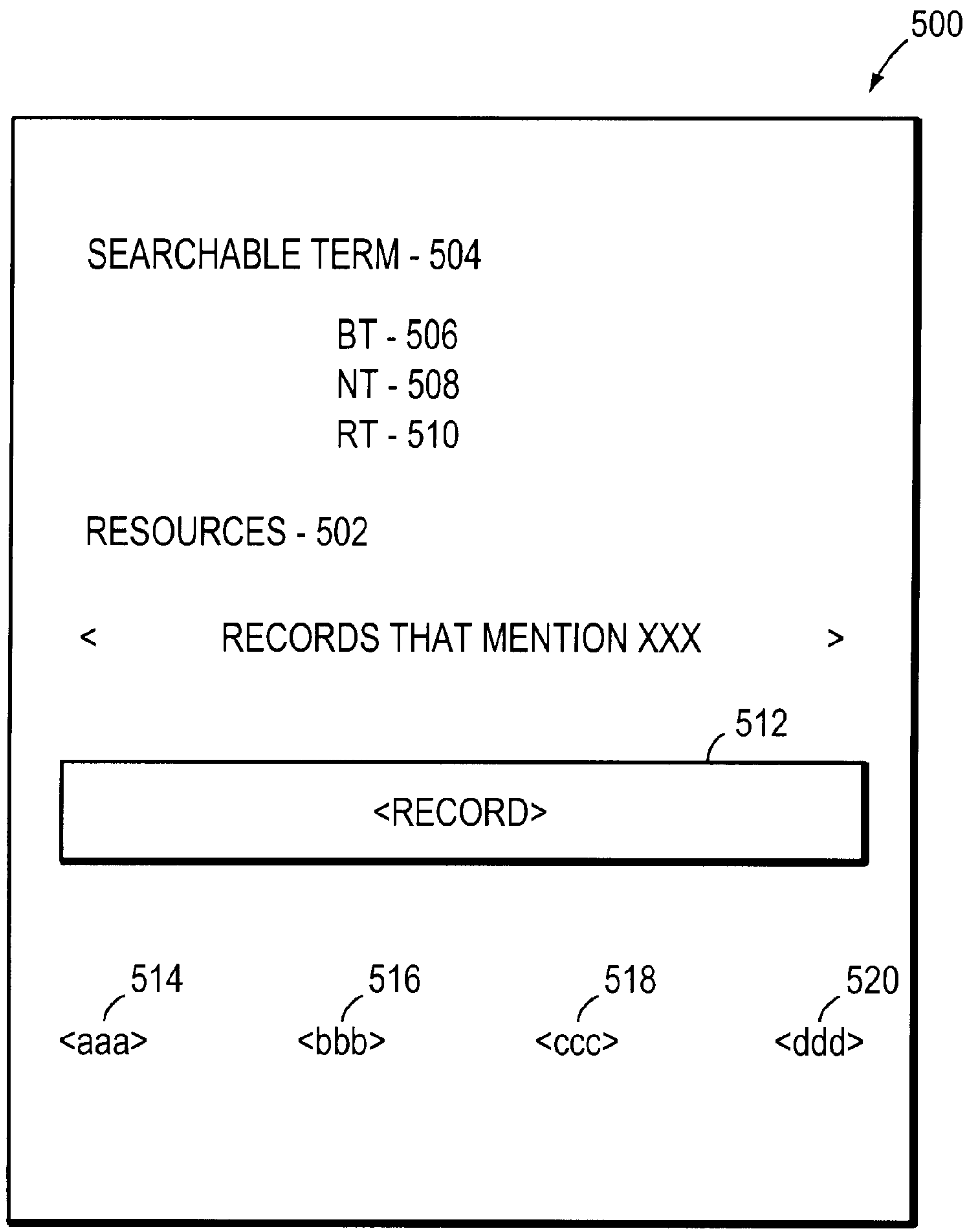
FIG. 5 is a logical representation of an alternative search results display screen.

FIG. 4 is a logical representation of an exemplary search results display screen 400. The illustrative user interface 102 displays the screen 400 to a user in response to a user entering the search term "SUVs." As shown, the screen 400 includes the searchable term 402 of the node returned by the search engine 104. The screen 400 also includes a Broader Term (BT) 404, any number of Narrower Terms (NTs) 406 and any number of Related Terms (RTs) 408. BTs, NTs and RTs are discussed in further detail below with respect to FIGS. 7A, 7B and 8. The display screen 400 also displays any record 410 encoded with the unique identifier of the data node having the searchable term 406. The display screen 410 further includes the additional searchable terms 412 and 414 of data nodes whose unique identifiers also encode the record 410.

According to the illustrative embodiment, the user can initiate the above discussed browsing feature by selecting one of the displayed searchable terms 412 or 414. The user can also initiate browsing by selecting the BT 404, an NT 406 or an RT 408. In response to the user selecting one of the displayed terms, the search engine 104 proceeds as previously described with respect to steps 304–310 of FIG. 3. As skilled artisans will appreciate, the display screen 400 facilitates combining term-type searching with browsing.

As mentioned above, according to a further feature of the invention, a user can enter a search term and specify that the search engine 104 search the data storage system 108 for documents containing the entered search term, independent from the hierarchical data map 106. FIG. 5 depicts an illustrative display screen 500, such as might be generated by such a specification. As can be seen, in response to the user specification, the search engine 104 returns a resource list 502 of records containing the user entered search term. The search engine 104 also returns the data node searchable term 504 that includes the user entered search term. As in the case of the display screen 400, the search engine also returns the BT 506, any NTs 508 and any RTs 510, associated with the data node having the searchable term 504.

The display screen 500 also presents a list of records 512 that are encoded with the unique identifier of the data node having the searchable term 504. Also presented are the searchable terms 514–520 of data nodes whose unique identifiers encode any of the records of the list 512. The encoding unique identifiers may be different for each record in the list 512.

As in the case of the display screen 400, the user can initiate browsing by selecting any of the data nodes represented by the displayed searchable terms 514–520, the BT 506, or any of the NTs 508 or RTs 510. In response to such a user selection, the search engine 104 proceeds as discussed with respect to steps 304–310 of FIG. 3.

Figure 6:
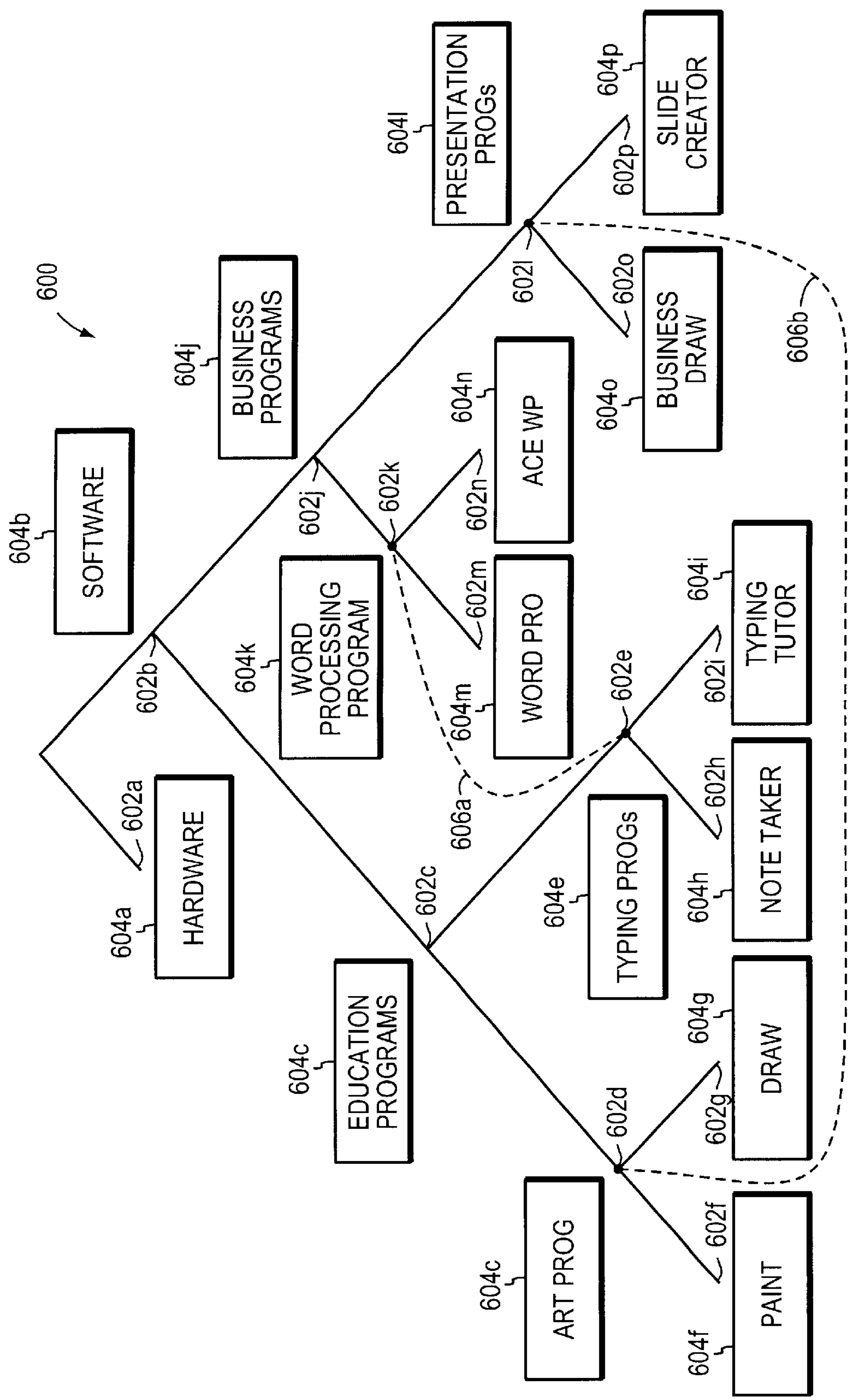
FIG. 6. is an exemplary embodiment of a plurality of hierarchies of data nodes in a hierarchical data map.

FIG. 6 provides a logical representation of an illustrative hierarchical data map 600 of the type depicted at 106 in FIG. 1. FIGS. 7*a* and 7*b* provide illustrative contents of the data nodes 602*a*–602*p* of the data map 600. Referring to FIGS. 6, 7A, and 7B, the illustrative hierarchical data map 600 includes a plurality hierarchies of data nodes 602*a*–602*p*. Each of the data nodes 602*a*–602*p* includes a searchable term 604*a*–604*p*, respectively. The contents of each data node 602*a*–602*p* also provides a description of the node's relationships to other nodes in the plurality of hierarchies. As further shown in FIGS. 7A and 7B, the data nodes 602*a*–602*p* include a unique identifier 702*a*–702*p*, respectively. According to the illustrative embodiment, the hierarchical data map 600 is constructed substantially in accord with ISO Z39.19–1993. However, as skilled artisans will appreciate other hierarchical data map structures can be employed with the system 100 of the invention.

During a search, the search engine 104 traverses the hierarchical data map 106 to locate the user-specified search terms provided via the user interface 102. The traversal of the hierarchical data map 106 involves searching through the contents of a subset the data nodes 602*a*–602*p*. The search engine 104 retrieves the unique identifiers of the data nodes 602*a*–602*p* that include the user-specified terms. According to the illustrative embodiment, in traversing the data map 600, the search engine 104 utilizes cross-links between the data nodes 602*a*–602*p*. Cross-links provide pointers between data nodes that include searchable terms 604*a*–604*p* that are related to a user-specified search term.

By way of example, the dashed line 606*a* indicates a cross-linked relationship between the data node 602*e* and the data node 602*k*. The dashed line 606*b* illustrates a cross-linked relationship between the data node 602*d* and the data node 602*l*. As shown in FIG. 7, cross-linked nodes are typically located in different hierarchies or in different branches of the same hierarchy. By way of example, the cross-link 606*b* points between the data node 602*d*, which includes the searchable term "Art Programs" in the "Education Programs" hierarchy (see also 604*c* and 604*d* in FIG. 7A), and the data node 602*l*, which includes the term "Presentation Programs" in the "Business Programs" hierarchy (see also 604*l* and 604*j* in FIG. 7B).

If the specified term is a non-preferred term 708, the search engine 104 redirects the search to a preferred term, such as that shown at 604*c* or 710. For example, as shown at 708, the term "Learning Programs" is a non-preferred term. The search engine 104 uses the contents of the "use" field 710 to redirect itself to the preferred term 604*c* "Education Programs". As used herein, the phrase "non-preferred term" is a searchable term associated with a data node, wherein the unique identifier of the data node is not used to encode records stored in the data storage system. As used herein, the phrase "preferred term" is a searchable term associated with a data node, wherein the unique identifier of the data node is used to encode records stored in the data storage system.

Figure 8:
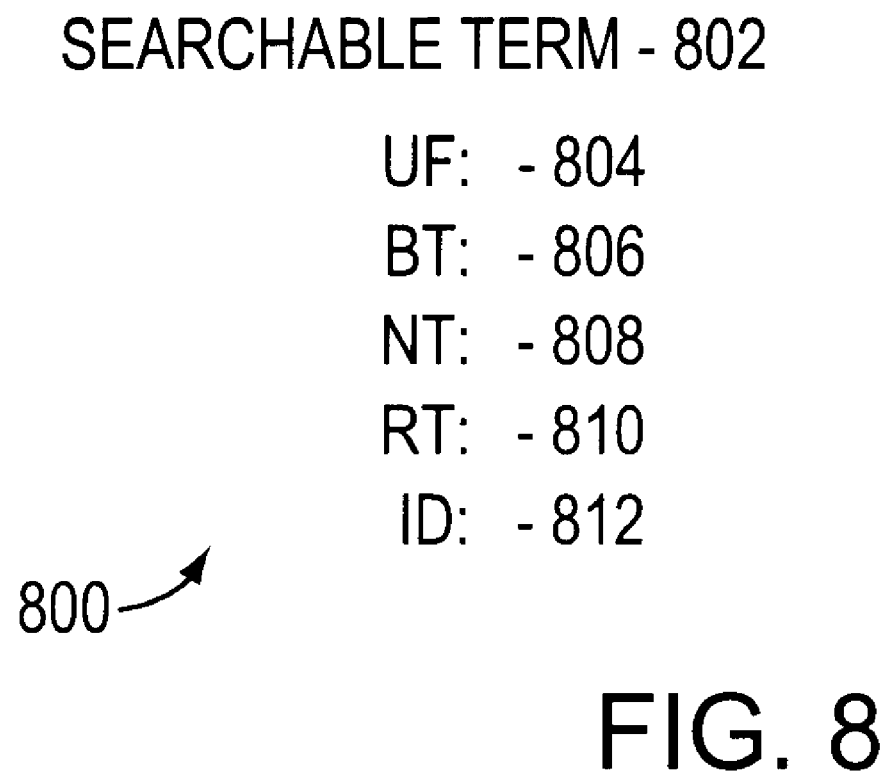

FIG. 8 depicts the contents of an illustrative preferred data node 800, of the type depicted at 602*a*–602*p* in FIG. 6. The data node 800 includes: a "term" field 802, a UF field 804, a BT field 806, a NT field 808, a RT field 810, and a "unique identifier" (ID) field 812. The "term" field 802 contains a searchable term, such as those depicted in 604*a*–604*p*. In the illustrative embodiment, the searchable term can be either associated with preferred or non-preferred data node. The UF field 804 contains a searchable term associated with a non-preferred data node. A UF field is illustrated at 709.

Operationally, the search engine 104 employs the contents of the "use for" field 804 to point to a data node having a non-preferred term that matches the contents of the "use for" field 804. The search engine 104 captures the unique identifier of the "preferred term" node to use while searching the database storage system 108. However, for display purposes, the search engine 104 returns both preferred and non-preferred terms to the user interface 102.

The BT field 806 contains the searchable term associated with the node that is one direct hierarchical step above the generic node 800. The NT field 808 contains contains a searchable term of a node that is one direct hierarchical step below the generic node 800. The RT field 810 contains a searchable term for a node that has a searchable term which is content-related to the searchable term 802 to the generic node 800, but is in another hierarchy or in another branch of the same hierarchy. As previously mentioned, this provides the cross-links 606*a* and 606*b* between content-related data nodes. By providing this feature, the search engine 104 is less likely to miss a relevant record in the HIdatabase storage system 108, due to a user failing to enter an important search term, or due to a document being partially miscoded. The "unique identifier" 812 field, illustratively, contains an alpha-numeric identifier unique to the data node.

Although the hierarchical data map 600 is depicted as a binary tree, skilled artisans will appreciate that in practice any number of branches may extend from a particular data node. Accordingly, the illustrative node 800 may include an unlimited number of UF fields 804, NT fields 808 and RT fields 810.

Additionally, although the data node 800 is illustratively depicted as including both a searchable term 802 and a unique identifier 812, skilled artisans will further appreciate that in an alternative embodiment, the unique identifier 812 can be omitted, and the searchable term 802 employed as a unique identifier. In this embodiment, all of the data nodes are encoded with unique searchable terms.

Figure 9:
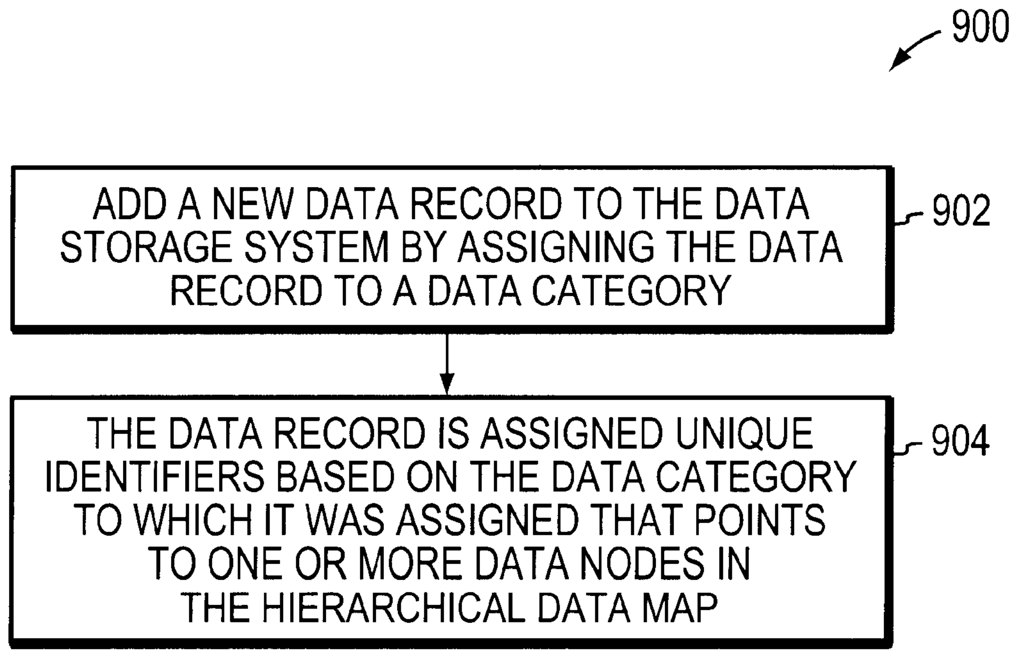
FIG. 9 is a flow chart illustrating a method for storing data records, according to one embodiment of the invention.

In yet another embodiment, the data node 800 can employ multiple unique identifiers 812. Illustratively, one unique identifier can identify a logical position: in the hierarchical data map 600 and another unique identifier can be employed to encode records in the data storage system 108. As mentioned previously, records of the database storage system 108 are encoded with particular ones of the data node identifiers, based at least in part on the informational content of the record. FIG. 9 is a flow diagram 900 illustrating a process for storing records in the data storage system 108 in accord with the invention. As shown at 902, the method 900 begins with a new data record being assigned to a data category based, at least in part, on the content of the data record. As shown at step 904, based on the data category assignment and the relationship between the data category assignment and the searchable terms 604*a*–604*p*, the data record is encoded with one or more unique data node identifiers 704*a*–704*n*. With the data records so encoded, a user may perform the above described methods of searching using the system 100 of the illustrative embodiment of the invention.

Figure 10:
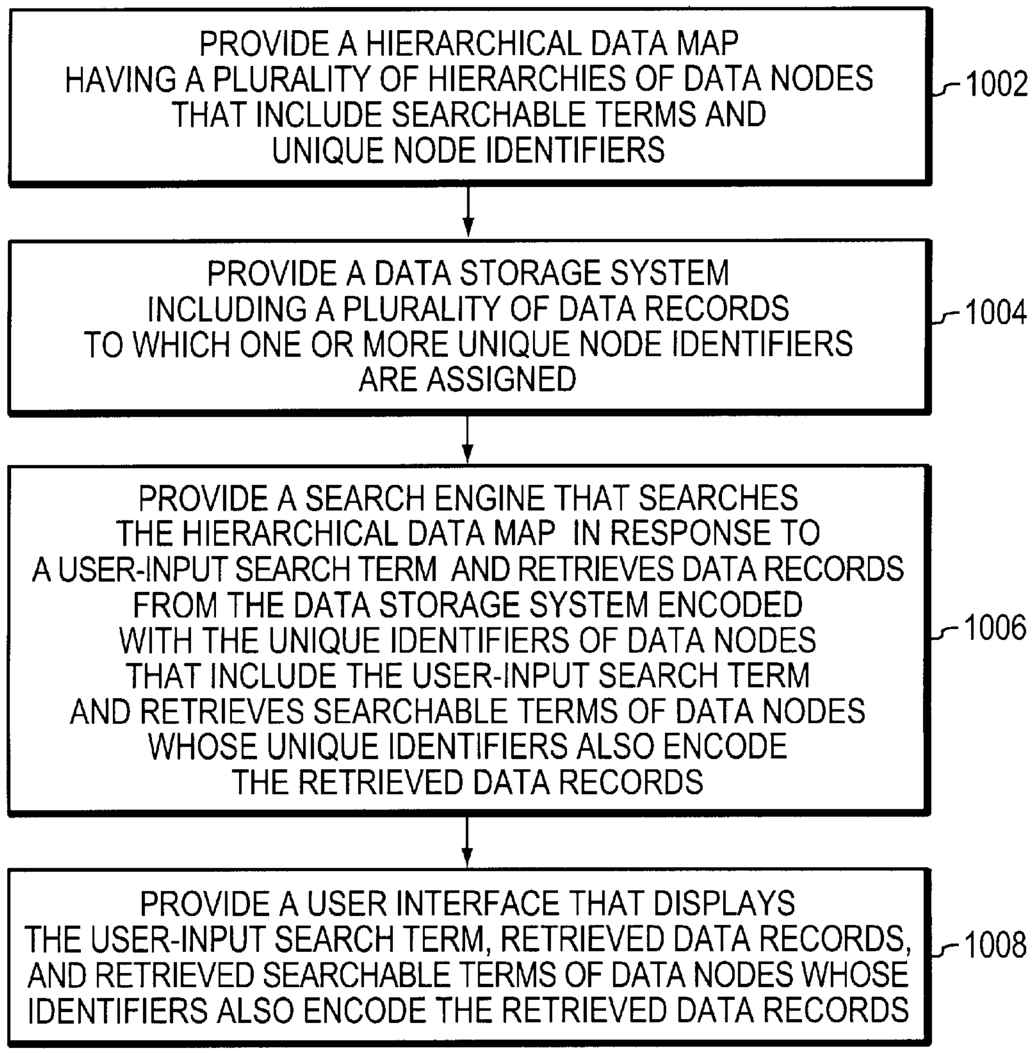
FIG. 10 illustrates an exemplary methodology that can be used with a database system, according to an embodiment of the invention.

In one embodiment and with reference to FIG. 10. the disclosed methods and systems can provide a hierarchical data map 106 having a plurality of data node hierarchies that can include searchable terms and unique node identifiers (1002). A data storase system 108 can also be provided that includes a plurality of data records to which one or more of the unique node identifiers are assigned (1004). In response to a user-input search term, a search engine 104 can search the hierarchical data map 106 and retrieve data records from the data storage system 108 that are encoded with the unique identifiers of data nodes that include the user-input search term and can retrieve searchable terms of data nodes whose unique identifiers also encode the retrieved data records (1006). The user-input search term, retrieved data records, and retrieved searchable terms of data nodes whose identifiers also encode the retrieved data records can be displayed in a user interface 102 (1008).

Thus, the invention provides database systems and methods having improved flexibility with regard to tolerating inexact search terms. The invention also provides database systems and methods, which exploit relationships between the data stored in a database. The invention further provides a database system having improved flexibility with respect to tolerating inexact indexing of records in a database.

Additionally, as skilled artisans will appreciate, the above described invention may be employed in a network-based system, such as the Internet, to provide networked enterprises with a mechanism for storing documents in an easily retrievable manner. By way of example, an Internet-based company may employ a system in accord with the invention to store documents, and to make a database of those documents easily available to potential customers. Alternatively, the invention may be employed in an enterprise's internal network to provide employees with access to internal enterprise documents.

Accordingly, it is intended that all matter contained in the above description be interpreted as illustrative rather than in a limiting sense, the scope of the invention being indicated by the appended claims rather than by the foregoing description. It is also intended that the appended claims cover all the generic and specific features of the invention as described herein, and all of the changes which come within the meaning and range of equivalency of the claims.

I claim:

1. A database system comprising, a hierarchical data map having a plurality of data nodes organized in a plurality of hierarchies, wherein each of said plurality of data nodes has an associated unique identifier and at least one associated searchable term, a data storage system including a plurality of data records, wherein each of said data records is encoded with a plurality of said unique identifiers, and a search engine communicatively coupled to the hierarchical data map and data storage system, the search engine identifying at least one first data record of the plurality of data records encoded with the unique identifier of a first one of the plurality of data nodes in response to receiving a user-input search term, wherein the search engine identifies at least one searchable term associated with a second one of the plurality of data nodes whose unique identifier also encodes the first data record.

2. A database system according to claim 1, wherein said unique identifier of said second data node encodes said first data record, based at least in part, on a relationship between content of said first data record and said searchable term of said second data node.

3. A database system according to claim 1, further comprising, a user interface displaying the user-input search term, at least part of the first data record, and the searchable term associated with the second data node.

4. A database system according to claim 1, wherein said unique identifier is a searchable term.

5. A database system according to claim 1, wherein said unique identifier is an alpha-numeric character.

6. A database system according to claim 1, wherein said search engine retrieves said first data record by first retrieving said unique identifier of said first data node from said hierarchical data map.

7. A database system according claim 1, wherein said search engine traverses said hierarchical data map to retrieve said first data record.

8. A database system according to claim 7, wherein said search engine retrieves said first data record from said plurality of data records in response to retrieving said unique identifier of said first data node from said hierarchical data map.

9. A database system according to claim 1, further comprising, a user interface enabling a user to enter said user-input search term, wherein said search engine retrieves said first data record from said data storage system by traversing said hierarchical data map, capturing said unique identifier of said first data node having a searchable term which includes said user-input search term, and employing said captured unique identifier to retrieve said first data record.

10. A database system according to claim 9, wherein said search engine matches said captured unique identifier with said unique identifier encoding said first data record to retrieve said first data record.

11. A database system according to claim 1, further comprising, a user interface enabling a user to enter said user-input search term and presenting to said user a searchable term associated with said first, data node, wherein said search engine captures said unique identifier of said first data node which has searchable terms including said user-input search term, and providing said searchable terms of said first data node to said user interface for presentation to said user.

12. A database system according to claim 1, wherein at least some of said data nodes of said hierarchical data map include cross-links providing pointers between selected ones of said data nodes located in different hierarchies, wherein said searchable terms of said selected data nodes are subject matter related, and said search engine retrieves selected ones of said data nodes having searchable terms that include said user-input search term.

13. A database system according to claim 1, wherein at least some of said data nodes of said hierarchical data map include cross-links providing pointers between selected ones of said data nodes located in a different logical branch of a hierarchy, wherein said searchable terms of said selected data nodes are subject matter related, and said search engine retrieves selected ones of said data nodes having searchable terms that include said user-input search term.

14. A database system according to claim 11, wherein said user interface enables said user to select said presented searchable term, and said search engine retrieves at least one data record from said data storage system in response to said user's selection.

15. A database system according to claim 14, wherein said search engine determines that said retrieved data record is encoded with said unique identifier of said first data node.

16. A database system according to claim 1, further comprising, a user interface presenting a subset of said searchable terms of said data nodes to a user and enabling said user to select one of said subset of said searchable terms, and a search engine providing said user interface with a different subset of said searchable terms of said data nodes in response to said user's selection.

17. A database system according to claim 1, wherein said second data node is hierarchically one level above said first data node in said hierarchical data map.

18. A database system according to claim 1, wherein said second data node is hierarchically one level below said first data node in said hierarchical data map.

19. A database system according to claim 1, wherein said second data node includes data nodes that are hierarchically below said first data node in said hierarchical data map.

20. A database system according to claim 1, wherein said second data node is cross-linked to said first data node.

21. A database system according to claim 1, wherein said searchable term associated with said second data node corresponds to a preferred term and a searchable term associated with the first data node corresponds to a non-preferred term.

22. A database system according to claim 21, wherein said search engine retrieves said unique identifier of said second data node in response to matching said user-input search term with said non-preferred term of said first data node.

23. A database system according to claim 22, wherein said first data node having said non-preferred term includes a pointer to said second data node having said preferred term.

24. A database system comprising:

a first data node including a first identifier and at least one first searchable term;

a second data node including a second identifier and at least one second searchable term wherein the first identifier differs from second identifier;

a hierarchical data map organizing a plurality of data nodes, including the first and second data nodes, into at least one hierarchy;

a search engine communicatively coupled to the hierarchical data map and identifying at least one first data record encoded with the first identifier of the first data node in response to receiving a user-input search term corresponding to the first searchable term, the first data record also being encoded with the second identifier of the second data node, wherein the search engine retrieves the second searchable term; and a user interface receiving the second searchable term from the search engine and displaying the user-input search term, at least part of the first data record, and the second searchable term.

25. A database system according to claim 24, wherein the encoding of the first data record with the first and second identifiers of the associated first and second data nodes is based, at least in part, on a subject matter relationship between content of the first data record and the first and second searchable terms.

26. A database method comprising, providing a hierarchical data map having a plurality of data nodes organized in a plurality of hierarchies, wherein each of said plurality of data nodes has an associated unique identifier and at least one associated searchable term, providing a data storage system including a plurality of data records, wherein each of said data records is encoded with a plurality of said unique identifiers, identifying at least one first data record of the plurality of data records encoded with the unique identifier of a first one of the plurality of data nodes, in response to receiving a user-input search term, and identifying at least one searchable term associated with a second one of the plurality of data nodes whose unique identifier also encodes the first data record.

27. A database method according to claim 26, further comprising, encoding said first data record with said unique identifier of said second data node, based at least in part on a relationship between content of said first data record and said searchable term of said second data node.

28. A database method according to claim 26, further comprising, retrieving said first data record by first retrieving said unique identifier of said first data node from said hierarchical data map.

29. A database method according to claim 26, further comprising, traversing said hierarchical data map to retrieve said first data record.

30. A database method according to claim 29, further comprising, retrieving said first data record from said plurality of data records in response to retrieving said unique identifier of said first data node from said hierarchical data map.

31. A database method according to claim 26, further comprising, enabling a user to enter said user-input search term, retrieving said first data record from said data storage system by traversing said hierarchical data map, capturing said unique identifier of said first data node having a searchable term which includes said user-input search term, and employing said captured unique identifier to retrieve said first data record.

32. A database method according to claim 31, further comprising, matching said captured unique identifier with said unique identifier encoding said first data record to retrieve said first data record.

33. A database method according to claim 26, further comprising, enabling a user to enter said user-input search term, capturing said unique identifier of said first data node which has searchable terms including said user-input search term, and presenting said searchable terms of said first data node to said user.

34. A database method according to claim 26, further comprising, providing cross-links between at least some of said data nodes of said hierarchical data map, said cross-links providing pointers between selected ones of said data nodes located in different hierarchies, wherein said searchable terms of said selected data nodes are subject matter related, and retrieving selected ones of said data nodes having searchable terms that include said user-input search term.

35. A database method according to claim 26, further comprising, providing cross-links between at least some of said data nodes of said hierarchical data map, said cross-links providing pointers between selected ones of said data nodes located in a different branch of a hierarchy, wherein said searchable terms of said selected data nodes are subject matter related, and retrieving selected ones of said data nodes having searchable terms that include said user-input search term.

36. A database method according to claim 33, further comprising, enabling said user to select said presented searchable term, and retrieving at least one data record from said data storage system in response to said user's selection.

37. A database method according to claim 36, further comprising, determining that said retrieved data record is encoded with said unique identifier of said first data node.

38. A database method according to claim 26, further comprising, presenting a subset of said searchable terms associated with said data nodes to a user, enabling said user to select one of said presented searchable terms, and presenting a different subset of said searchable terms of said data nodes to said user in response to said user's selection.

39. A database method according to claim 38, further comprising, presenting selected ones of said data records stored in said data storage system to said user in response to said user's selection.

40. A database method according to claim 26, wherein said second data node is hierarchically one level above said first data node in said hierarchical data map.

41. A database method according to claim 26, wherein said first data node is hierarchically one level below said first data node in said hierarchical data map.

42. A database method according to claim 26, wherein said second data node includes data nodes that are hierarchically below said first data node in said hierarchical data map.

43. A database method according to claim 26 wherein said second data node is cross-linked to said first data node.

44. A database method according to claim 26, wherein said searchable term associated with said second data node corresponds to a preferred term and a searchable term associated with said first data node corresponds to a non-preferred term.

45. A database method according to claim 44, further comprising, retrieving said unique identifier of said second data node, having said preferred term, in response to matching said user-input search term with said non-preferred term of said first data node.

46. A database method according to claim 44, wherein said first data node having said non-preferred term includes a pointer to said second data node having said preferred term.

47. A database method comprising:

providing a first data node including a first identifier and at least one first searchable term;

providing a second data node including a second identifier and at least one second searchable term wherein the first identifier differs from the second identifier;

providing a hierarchical data map organizing a plurality of data nodes, including the first and second data nodes, into at least one hierarchy;

identifying at least one first data record encoded with the first identifier of the first data node in response to receiving a user-input search term corresponding to the first searchable term, the first data record also being encoded with the second identifier of the second data node; and displaying the user-input search term, at least part of the first data record, and the second searchable term.

48. A database method according to claim 47, further comprising, encoding the first data record with the first and second identifiers of the associated first and second data nodes based, at least in part, on a subject matter relationship between content of the first data record and the first and second searchable terms.

* * * * *